Figure 3:
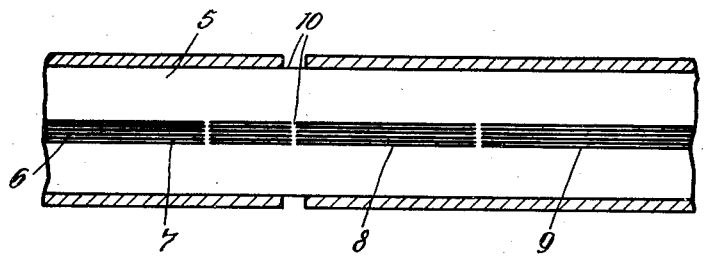

April 12, 1932.   E. FISCHER   1,853,676
SUBMARINE CABLE
Filed July 29, 1929   2 Sheets-Sheet 1
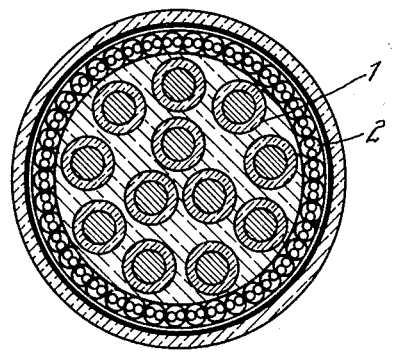
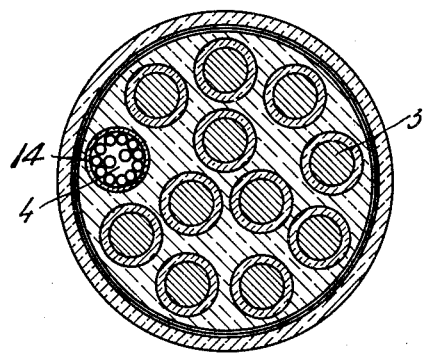
Inventor
Ernst Fischer
by Knight Bro
attorneys April 12, 1932. E. FISCHER 1,853,676
SUBMARINE CABLE
Filed July 29, 1929 2 Sheets-Sheet 2

Patented Apr. 12, 1932

1,853,676

UNITED STATES PATENT OFFICE

ERNST FISCHER, OF BERLIN-TEMPELHOF, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

SUBMARINE CABLE

Application filed July 29, 1929, Serial No. 381,779, and in Germany August 3, 1928.

My invention relates to improvements in cables, and more particularly in submarine long distance communication cables.

The provision of compensating condensers for diminishing cross-talk or for compensating coil field capacities (longitudinal compensation) causes considerable inconveniences in the manufacture of submarine cables, because it is very difficult to accommodate condenser bushings and similar receptacles containing the condensers. For cables laid in the ground it has already been proposed to employ a special short length of cable located parallel to the cable for compensating the cross-talk couplings. One or more conductors having a definite capacity are in such cases employed as compensating or neutralizing condensers. This design is, however, not applicable to submarine or sea cables.

According to my invention additional conductors are placed into a submarine cable in such a manner that the flexibility of the cable is scarcely affected thereby. These additional conductors are located underneath the lead sheath of the cable, for instance in a circular ring. They may be stranded together per se and combined with the cable conductors to form the cable core. The additional conductors may extend along the entire length of the cable and may be surrounded by a metallic screening envelope for reducing detrimental couplings. They have a certain capacity and may thus be utilized as compensating condensers. If desired the additional conductors (condenser conductors) may be subdivided in sections of suitable length.

It is according to my invention also possible to connect a plurality of condenser conductors in parallel or to combine them in any other suitable manner in order to vary their capacity values. The condenser conductors may be stranded or twisted together in the manner well known in the art so that they do not interfere with one another and are not detrimentally affected by the main conductors. They may also be screened in the customary manner by protective sleeves of conducting and/or magnetic material.

A preferred embodiment of my invention consists in providing the outer ends of those cable portions which form the ends of a coil field, with a closed layer of condenser conductors along a length of a few metres. Whenever required some of these condenser conductors are, after the cable is finished or already during its manufacture, employed as compensating condensers or the like for the main conductors.

For a particularly exact compensation a portion of the condenser conductors may be made comparatively short. The conductors may then at the end of the cable section be pulled out of the insulation a certain length until the additional capacity possesses as accurately as possible the desired value. The projecting portion of the conductor is then cut off.

Two embodiments of my invention are illustrated in the drawings affixed to my specification. In these drawings Fig. 1 represents a cross-section through one construction of my improved cable, Fig. 2, a cross-section through a modification, and Fig. 3, a longitudinal section through a still further modification of my invention.

Referring to Fig. 1 of the drawings, 1 is the bundle of the main conductors of a submarine cable which, for instance, may consist of 12 quads. Around this bundle a layer 2 of condenser conductors, for instance pairs, is placed along the entire length of the cable, this layer 2 being combined with bundle 1 to form the cable core. The individual condenser conductors are cut into different lengths so that the individual sections have different capacities. This permits of a very accurate compensation between the main conductors, by connecting two main conductors with two or more condenser conductor lengths combined in any suitable manner. 14 is a screen which electrostatically and electromagnetically screens the condenser conductors from the main conductors.

In Fig. 2 of the drawings a bundle of condenser conductors 4 for a number of cable conductors is stranded or twisted together with the main conductors 3 along the entire length of the cable. This bundle is subdivided into sections of different lengths which are individually employed as compensating conductors for the various main conductors.

Referring to Fig. 3 of the drawings, 5 is a piece of cable of, for instance, a little over 30 meters length. Into the gaps which are formed by the speech circuits, is placed along the entire cable the condenser bunch 6 which is cut into lengths of 10 meters each, so that in the illustration the sections 7, 8 and 9 result. These sections contain conductors of different diameter and thus of different capacity. At the finished cable core the compensation may then be effected at any desired point by connecting the individual condenser conductors with the conductors of the cable. If very small capacities only are required for the compensation, a piece of cable of 10 meters length may be subdivided again.

If it is desired to effect the compensation subsequently, for instance after the cable has already been provided with a lead sheath, the lead sheath is cut open at any desired point, for instance at the point marked 10. Since the group of condenser conductors passes along the entire cable length, the condenser conductors will be encountered at any place of the cable. At this point 10 the condenser conductors are likewise cut through so that, for instance, at one side the condenser conductors are 3 metres distant from the cut and at the other side 7 metres. By employing the condenser conductors in the lengths cut or by connecting the condenser conductors in parallel, any desired capacity may be produced for the compensation.

Various modifications and changes may be made without departing from the spirit and the scope of the invention.

I claim as my invention:

1. A long distance communication cable, having insulated cable conductors combined into a cable core, a lead sheath enclosing said cable core, and condenser conductors adapted to compensate detrimental cross-talk couplings and being located within said lead sheath, at least some of said additional condenser conductors being electrically connected with said insulated cable conductors.

2. A long distance communication cable, having insulated cable conductors combined into a cable core, a lead sheath enclosing said cable core, and condenser conductors adapted to compensate detrimental cross-talk couplings and being located within said lead sheath and stranded together with the insulated conductors of the cable core, at least some of said condenser conductors being electrically connected with said insulated cable conductors.

3. A long distance communication cable, having insulated cable conductors combined into a cable core, a lead sheath enclosing said cable core, and condenser conductors adapted to compensate detrimental cross-talk couplings and being located within said lead sheath in a circular ring surrounding said cable core, at least some of said condenser conductors being electrically connected with said cable conductors.

4. A long distance communication cable, having insulated cable conductors combined into a cable core, a lead sheath enclosing said cable core, and condenser conductors adapted to compensate detrimental cross-talk couplings and forming part of said cable core, at least some of said condenser conductors being electrically connected with the insulated cable conductors.

5. A long distance communication cable, having cable conductors and condenser conductors adapted to compensate detrimental cross-talk couplings, both kinds of said conductors being combined to form the cable core, and a lead sheath enveloping said cable core, at least some of said condenser conductors being electrically connected with the insulated cable conductors.

6. A long distance communication cable, having insulated cable conductors united into a cable core, a lead sheath enveloping said cable core, condenser conductors adapted to compensate detrimental cross-talk couplings and being arranged within said lead sheath, said condenser conductors being insulated and stranded together, at least some of said condenser conductors being electrically connected with the cable conductors.

7. A long distance communication cable having insulated cable conductors and condenser conductors, said condenser conductors being adapted to compensate detrimental cross-talk couplings, both kinds of conductors being combined to form the cable core, a lead sheath surrounding said cable core, said condenser conductors being stranded together and also stranded together with the cable conductors, at least some of said condenser conductors being electrically connected with the cable conductors.

8. A long distance communication cable having insulated cable conductors combined into a cable core, a lead sheath enclosing said cable core, condenser conductors adapted to compensate detrimental cross-talk couplings and being located within said lead sheath, said condenser conductors extending along the entire length of the cable, at least some of said condenser conductors being electrically connected with the cable conductors.

9. A long distance communication cable, having insulated cable conductors combined into the cable core, a lead sheath enclosing said cable core, condenser condutors adapted to compensate detrimental cross-talk couplings and being located within said lead sheath, said condenser conductors extending along the entire length of the cable and being surrounded by a metallic screening envelope adapted to reduce detrimental couplings, at least some of said condenser conductors being electrically connected with said insulated cable conductors.

10. A long distance communication cable having cable conductors combined into a cable core, a lead sheath enclosing said cable core, condenser conductors adapted to compensate detrimental cross-talk couplings and being located within said lead sheath, groups of said condenser conductors being connected in parallel to one another, at least some of said condenser conductors being electrically connected with said insulated cable conductors.

In testimony whereof I affix my signature.

ERNST FISCHER.